(12) United States Patent
Ziemer

(10) Patent No.: US 6,935,480 B2
(45) Date of Patent: *Aug. 30, 2005

(54) AUTOMATIC TRANSMISSION START-UP DEVICE

(75) Inventor: Peter Ziemer, Tettnang (DE)

(73) Assignee: ZF Friedrichshafen AG (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/444,393

(22) Filed: May 23, 2003

(65) Prior Publication Data

US 2003/0217903 A1 Nov. 27, 2003

(30) Foreign Application Priority Data

May 24, 2002 (DE) .......................................... 102 22 930

(51) Int. Cl.⁷ ...................... F16D 25/0638; F16D 13/74
(52) U.S. Cl. ............................... 192/70.12; 192/85 AA; 192/113.36
(58) Field of Search ........................... 192/70.11, 70.12, 192/70.14, 85 AA, 106 F, 113.36

(56) References Cited

U.S. PATENT DOCUMENTS

| 1,024,520 | A | | 4/1912 | Miller | |
| 2,328,091 | A | * | 8/1943 | Nutt et al. | 192/85 AA |
| 3,225,627 | A | | 12/1965 | Christenson | |
| 5,101,953 | A | * | 4/1992 | Payvar | 192/113.36 |
| 5,755,314 | A | * | 5/1998 | Kanda et al. | 192/70.12 |
| 5,927,452 | A | * | 7/1999 | Freise et al. | 192/3.52 |
| 6,059,682 | A | * | 5/2000 | Friedmann et al. | 192/113.35 |
| 6,332,521 | B1 | * | 12/2001 | Shoji | 192/85 AA |
| 6,523,657 | B1 | * | 2/2003 | Kundermann et al. | 192/70.14 |
| 6,564,917 | B2 | * | 5/2003 | Katou et al. | 192/70.14 |
| 6,752,232 | B1 | * | 6/2004 | Hoher | 180/247 |
| 2001/0035323 | A1 | | 11/2001 | Porter | |
| 2002/0033314 | A1 | * | 3/2002 | Kato | 192/70.12 |
| 2004/0074732 | A1 | * | 4/2004 | Busold et al. | 192/87.13 |

FOREIGN PATENT DOCUMENTS

| DE | 91 14 528.7 | 3/1992 |
| DE | 692 10 003 T2 | 7/1993 |
| DE | 199 32 613 A1 | 1/2001 |
| DE | 199 50 047 A1 | 4/2001 |
| DE | 100 10 243 A1 | 9/2001 |
| DE | 100 12 385 A1 | 9/2001 |
| EP | 0 310 328 | 4/1989 |

OTHER PUBLICATIONS

German Search Report, Mar. 2003.

* cited by examiner

Primary Examiner—Rodney H. Bonck
(74) Attorney, Agent, or Firm—Milde & Hoffberg LLP

(57) ABSTRACT

A start-up element for an automatic transmission, comprising a start-up clutch arranged within a cover, which is flanged to a pump for the operating fluid, whereby a front pump support and gear seal are integrated in the cover.

20 Claims, 4 Drawing Sheets

AUTOMATIC TRANSMISSION START-UP DEVICE

FIELD OF THE INVENTION

The present invention relates to the field of start-up elements for automatic transmissions.

BACKGROUND OF THE INVENTION

As a rule, start-up elements for automatic transmissions are arranged in the drive train behind the engine and in front of the transmission, in order to accommodate the speed difference between the lowest operational speed of the engine and the stationary gearbox input shaft, which occurs upon the start-up of the vehicle from the stopped position. Force-locked clutches are typically used as start-up elements in manual transmissions, and hydrodynamic torque converters are employed with automatic transmissions.

The use of a brake at the sun gear of the incoming gear set of an automatic transmission, as a start-up element, is known from the publication "Getriebe in Fahrzeugen 2001" ["Transmissions in Vehicles 2001"] P. 461 p., Image 6, VDI-Berichte 1610 [VDI Reports 1610]. However, if a slip of the start-up element is required or desired in all gear selections, for example, for the purpose of an acoustic improvement, the brake at the sun gear described in this publication is not suitable as a start-up element, because it does not support torque transfer in its highest gear.

Wet start-up clutches have been recommended as start-up elements as well; however their structure is highly complex.

SUMMARY AND OBJECTS OF THE INVENTION

It is an object of the present invention to provide a start-up element for an automatic transmission that avoids various disadvantages of the state-of-the-art. In particular, a start-up element is provided having low structural complexity, and which allows slip in all gear positions.

In addition, the start-up element according to the present invention is compact, in order to provide the required space for additional components of the drive train, such as, for example, a crankshaft-mounted starter generator between the engine and the transmission. In particular, the overall length of the start-up element is preferably no longer than a conventional torque converter.

Accordingly, the present invention provides a startup clutch arranged within a cover that is flanged to the pump for circulating the operating fluid, preferably as a multiple disc clutch. The front pump support and the front gear seal are integrated in the cover. Preferably, the pump remains coupled to the engine side.

According to the present invention, channels present at a converter gear for opening and closing of the converter clutch are preferably used for controlling the start-up clutch, or for the cooling oil supply of the disc packet of the starter clutch.

BRIEF DESCRIPTION OF THE DRAWINGS

Following, the invention will be explained in greater detail based on the enclosed figures, of which

DETAILED DESCRIPTION OF THE PREFERRED EMBODIMENTS

Figure 1:
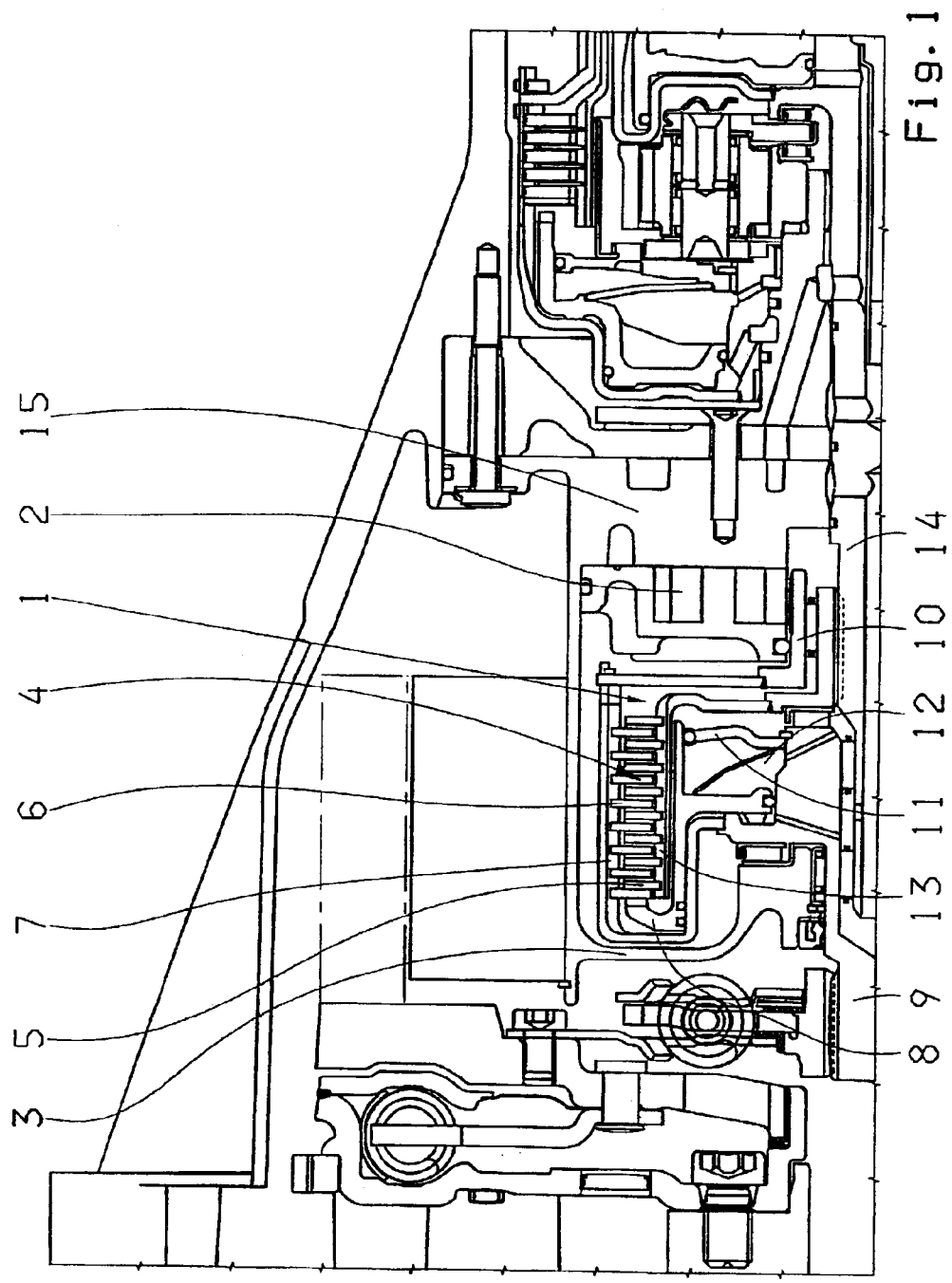
FIG. 1 shows a sectional view of a first preferred embodiment of a start-up element according to the present invention.

According to FIG. 1, a start-up clutch 1 is arranged within a housing or cover 3 flanged to a pump 2 for pumping the operating fluid. On the gear side, the pump 3 has a fixed connection to a centering plate 15, which forms a front gear housing wall, and typically includes several channels for distributing the operating fluid. Preferably, the start-up clutch 1 is designed as a multi disc clutch with a disc packet 4 that contains inner discs 5 and outer discs 6. According to the present invention, the cylinder 7 and the piston 8 of the start-up clutch 1 are preferably coupled to the engine side via a tappet 9. The pump 2 is coupled to the engine side as well; in the Figures, the pump tappet is shown as reference number 10.

This design allows for fast filling of the reservoir 12, which includes a retaining disc 11, and thus ensures a rapid build-up of the hydrodynamic pressure equalization. For better flow through the disc packet, it is particularly advantageous to design the outer discs 6 as grooved padded discs and the inner discs 5 as steel discs.

Figure 2:
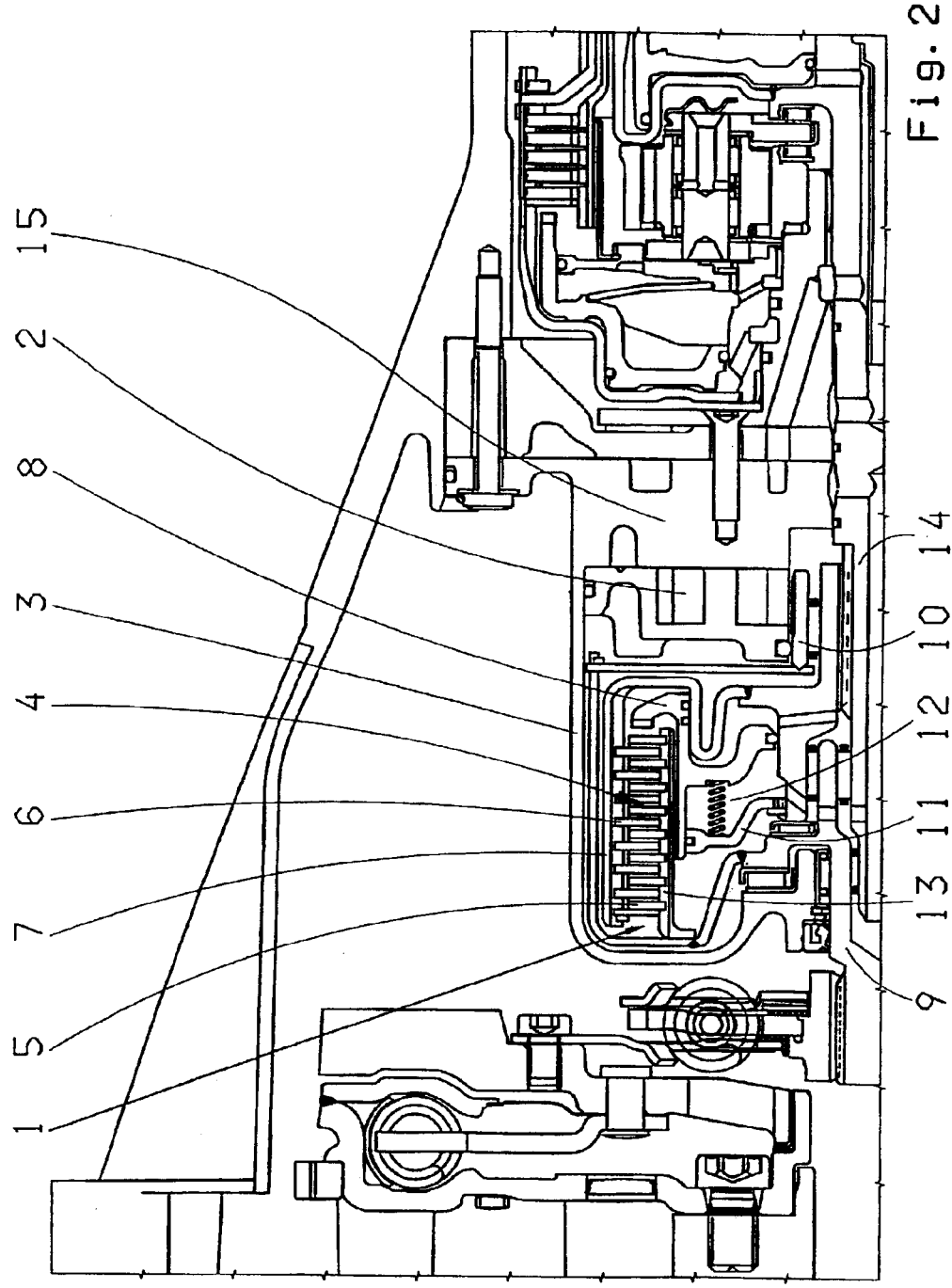
FIG. 2 shows a sectional view of a second preferred embodiment of a start-up element according to the present invention.

FIG. 2 presents an additional advantageous embodiment of the present invention. The inner disc carrier 13 of the disc packet 4 is coupled to the engine side, while the servo components 7, 8 of the clutch are connected to the gearbox input shaft 14. In this manner, the inner disc carrier that rotates at the engine speed transports the cooling oil into the disc packet 4.

Figure 3:
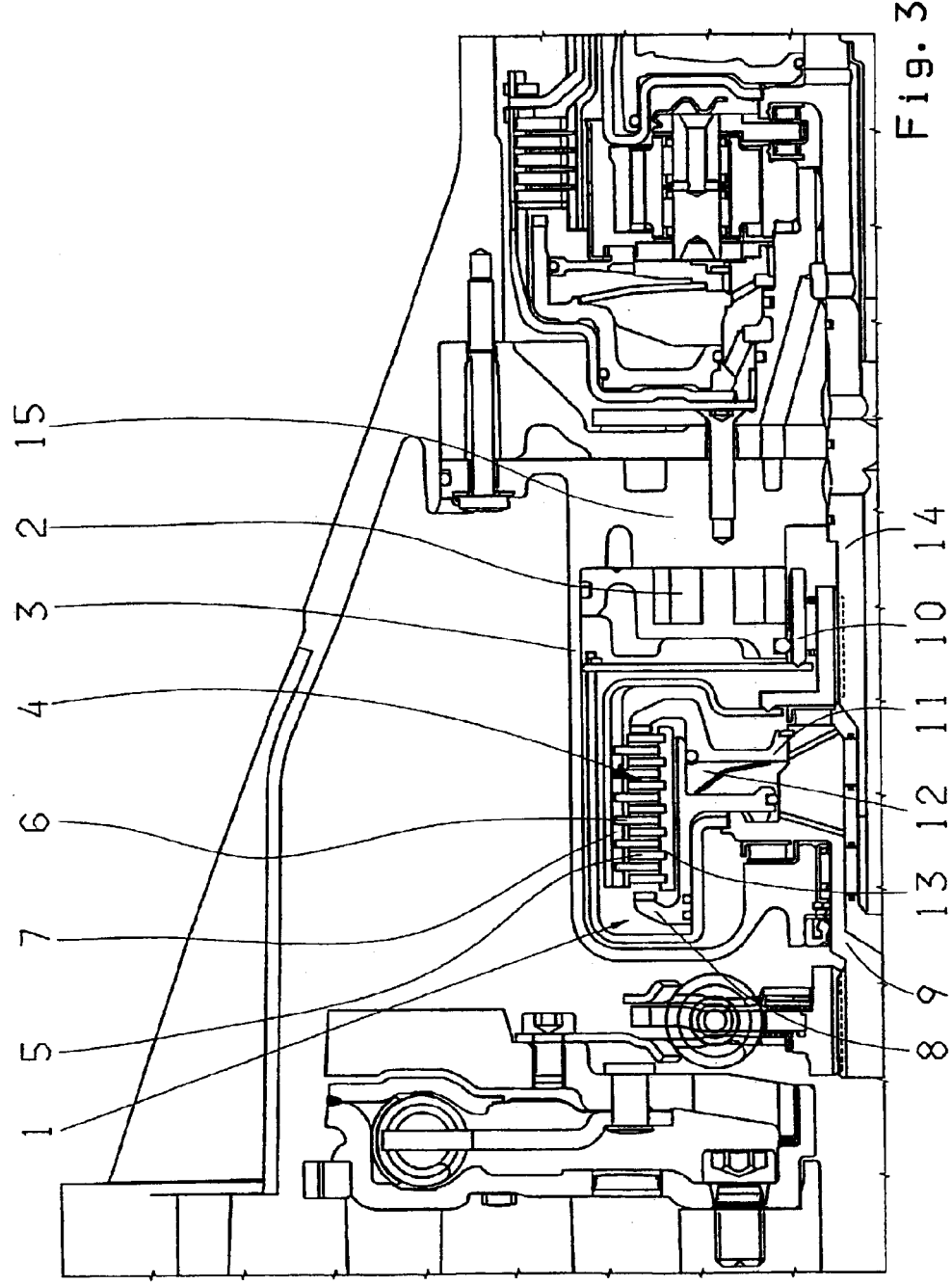
FIG. 3 shows a sectional view of a third preferred embodiment of a start-up element according to the present invention.

In the context of a third embodiment, which is shown in FIG. 3, the servo component of the start-up clutch 1 and the inner disc carrier 13 of the start-up clutch 1 are coupled to the engine side. This design achieves rapid filling of the reservoir 12 and thus a quick build-up of the hydrodynamic pressure equalization. At the same time, the inner disc carrier that rotates at the engine speed transports the cooling oil very effectively into the disc packet 4.

Figure 4:
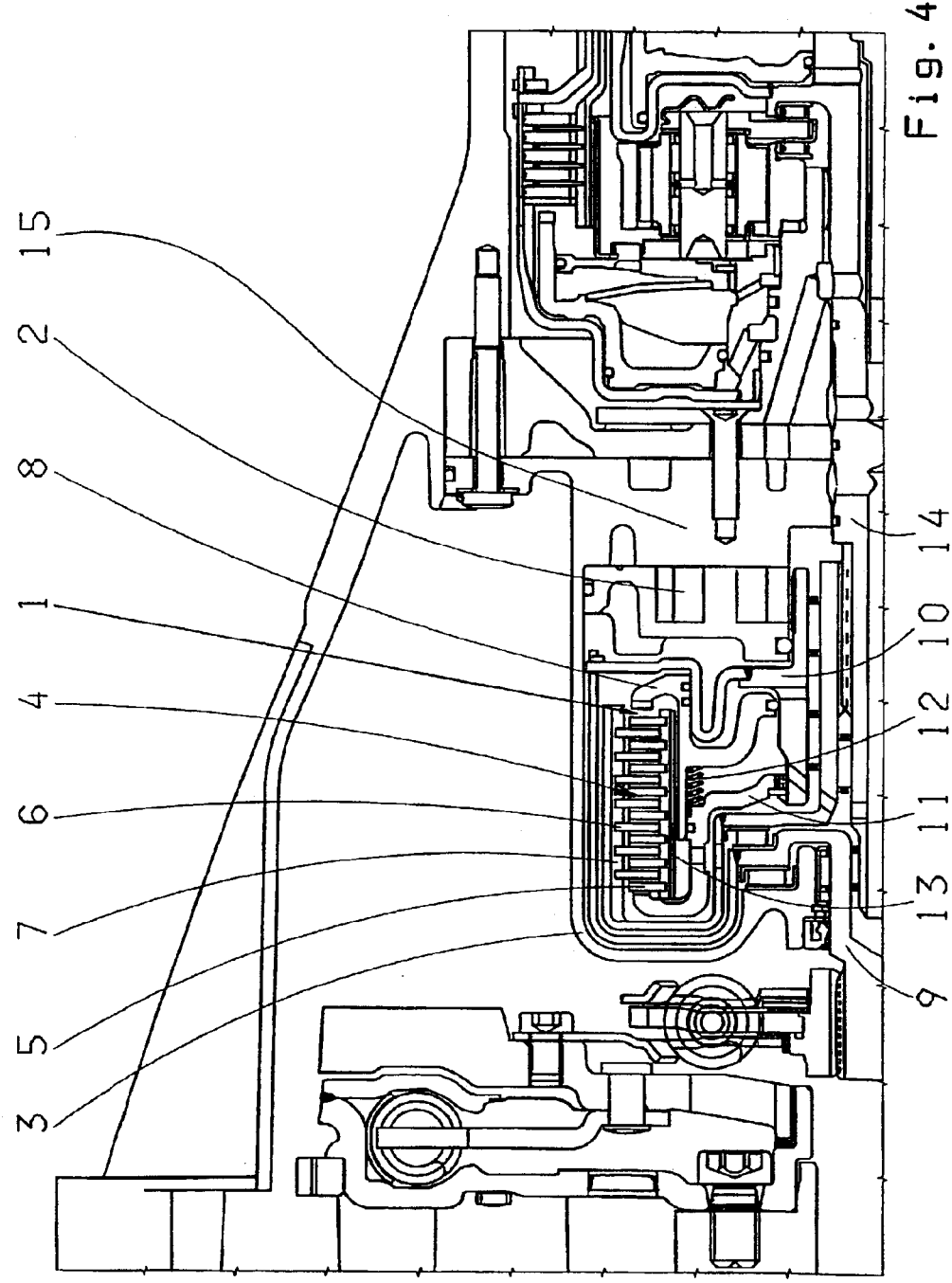
FIG. 4 shows a sectional view of an additional preferred embodiment of a start-up element according to the present invention.

FIG. 4 shows a variation of the embodiment of FIG. 3, where the elements of the inner disc carrier 13, the retaining disc 11, the disc packet 4 and the piston 8 are arranged in a mirrored manner, while retaining the advantages mentioned above.

Due to the arrangement according to embodiments of the present invention, there is no need for a torque converter or converter transmission; furthermore, it is possible to install a crankshaft-mounted starter generator, as well as additional components of the drive train, such as a dual-mass flywheel, because the overall space is optimally utilized.

An additional advantage of the present invention relies on the fact that the channels, which are present at a converter transmission for opening and closing the converter clutch, are used, according to embodiments of the present invention, to control the start-up clutch or for the cooling oil supply of the disc packet of the start-up clutch. In this manner, a typical torque converter that is used as the start-up element can be replaced at the transmission by the start-up element described above, preferably without significant additional cost.

The start-up clutch described herein can also be employed in an automatic transmission with an external pump for supplying fluid pressure to the automatic transmission. With this embodiment, the cover 3, with the start-up clutch arranged inside cover 3, is flanged directly to the centering plate 15 that has an integrated pump solidly connected to it in accordance with the embodiments described in the Figures above, instead of to the pump housing. Principal advantages of the present invention are retained in this arrangement as well.

While the above detailed description has shown, described and pointed out the fundamental novel features of the invention as applied to various embodiments, it will be understood that various omissions and substitutions and changes in the form and details of the system and method illustrated may be made by those skilled in the art, without departing from the spirit of the invention. Consequently, the full scope of the invention should be ascertained by the appended claims.

What is claimed is:

1. A start-up element for an automatic transmission, comprising:
    a fluid filled start-up clutch comprising relatively rotating frictional elements which are controlled to provide an idle mode with substantial slip and a power transmission mode with a controlled amount of slip, between a rotating engine input and a rotating gearbox output of an automatically controlled gearbox;
    a pump for pressurizing an operating fluid for operating the automatically controlled gearbox, the pump being flanged to the start-up clutch, and driven by the rotating shaft from the engine, independent of a state of the start-up clutch, while supplying cooling fluid to the start-up clutch; and
    a cover surrounding the start-up element and the pump, wherein the pump is supported on an engine side by front pump support integrated into the cover, and start-up clutch and the automatically controlled gearbox are separated by a gear seal integrated into the cover, whereby the pump and start-up clutch are provided together in a separate space from the automatically controlled gearbox separated by the gear seal.

2. The start-up element as set forth in claim 1, wherein the start-up clutch comprises a multiple disc clutch having a disc packet with inner discs and outer discs, controlled by a servo having a cylinder and a piston, wherein the start-up clutch is hydrodynamically pressure equalized, and wherein said pump provides pressurized fluid for operating both said servo and said automatically controlled gearbox.

3. The start-up element as set forth in claim 2, further comprising a starter generator linked to the rotating engine input.

4. A start-up element for an automatic transmission, comprising:
    a fluid filled startup clutch comprising relatively rotating frictional elements which are controlled to provide an idle mode and a transmission of power to an output of the startup element, having a rotating engine input, for receiving power from an engine, the startup clutch having hydrodynamic pressure equalization and permitting slip during operation;
    a rotating gearbox output of the startup clutch for transmitting power to an automatically controlled gearbox;
    a pump for pressurizing an operating fluid for operating the automatically controlled gearbox, the pump being flanged to the startup clutch, and driven by the rotating shaft from the engine, independent of a state of the startup clutch, while supplying cooling fluid to the startup clutch; and
    a cover surrounding the startup clutch and the pump, wherein the pump is supported on an engine side by front pump support integrated into the cover, and startup clutch and the automatically controlled gearbox are separated by a gear seal integrated into the cover, whereby the pump and startup clutch are provided together in a separate space from the automatically controlled gearbox separated by the gear seal.

5. The start-up element as set forth in claim 4, wherein the start-up clutch comprises a multiple disc clutch having a disc packet with inner discs and outer discs, controlled by a servo having a cylinder and a piston.

6. The start-up element as set forth in claim 5, wherein the inner discs are disposed on an inner disc carrier, the inner disc carrier being coupled to the engine side, and the servo is connected to an input shaft of the gearbox.

7. The start-up element as set forth in claim 5, wherein the cylinder and the piston of the start-up clutch are coupled to the engine side.

8. The start-up element as set forth in claim 5, wherein the cylinder, the piston and an inner disc carrier for supporting the inner discs of the start-up clutch are coupled to the engine side.

9. The start-up element as set forth in claim 5, wherein the outer discs are designed as grooved padded discs, and the inner discs are steel discs.

10. The start-up element as set forth in claim 4, further comprising a crankshaft mounted starter generator.

11. The start-up element as set forth in claim 4, further comprising a dual mass flywheel.

12. A method for transmitting power from an engine, comprising:
    receiving power through a rotating shaft from the engine to a fluid filled startup clutch, the startup clutch comprising relatively rotating frictional elements which are controlled to provide an idle mode and a transmission of power to an output of the startup element, the startup clutch having hydrodynamic pressure equalization and permitting slip during operation;
    transmitting power from an output of the startup clutch to an automatically controlled gearbox;
    pressurizing an operating fluid for operating the automatically controlled gearbox with a pump, the pump being flanged to the startup clutch, and driven by the rotating shaft from the engine, independent of a state of the startup clutch, while supplying cooling fluid to the startup clutch; and
    providing a cover surrounding the startup clutch and the pump, wherein the pump is supported on an engine side by front pump support integrated into the cover, and startup clutch and the automatically controlled gearbox are separated by a gear seal integrated into the cover, whereby the pump and startup clutch are provided together in a separate space from the automatically controlled gearbox separated by the gear seal.

13. The method of claim 12, wherein the start-up clutch comprises a multiple disc clutch having a disc packet with inner discs and outer discs, further comprising the step of controlling a cylinder and a piston with a servo.

14. The method of claim 13, wherein the inner discs are disposed on an inner disc carrier, the inner disc carrier being coupled to the engine side, and the servo is connected to an input shaft of the gearbox.

15. The method of claim 13, wherein the cylinder and the piston of the start-up clutch are coupled to the engine side.

16. The method of claim 13, wherein the cylinder, the piston and an inner disc carrier for supporting the inner discs of the start-up clutch are coupled to the engine side.

17. The method of claim 13, wherein the outer discs are designed as grooved padded discs, and the inner discs are steel discs.

18. The method of claim 12, wherein the start-up clutch is flanged to a centering plate, whereby the centering plate forms a front housing wall of the gearbox and whereby a front gear support and a front gear seal of the gearbox are integrated in the cover.

19. The method of claim 12, further comprising the step of linking a starter generator to the rotating shaft from the engine.

20. The method of claim 12, further comprising providing a dual mass flywheel linked to the rotating shaft from the engine.

* * * * *